United States Patent [19]
Rodebush et al.

[11] Patent Number: 5,397,471
[45] Date of Patent: Mar. 14, 1995

[54] SELF-CLEANING SCROLL AND SCREEN CENTRIFUGE

[75] Inventors: James R. Rodebush, West Chester, Ohio; Michael T. Mullins, Villa Hills, Ky.; Michael L. Vastola, Hamilton, Ohio

[73] Assignee: Tema Systems, Inc., Cincinnati, Ohio

[21] Appl. No.: 114,322

[22] Filed: Aug. 30, 1993

[51] Int. Cl.[6] .................................. B01D 33/06
[52] U.S. Cl. .................. 210/360.1; 210/380.1; 210/374; 210/398; 210/512.1; 210/512.3; 494/36; 494/38; 494/41; 494/55
[58] Field of Search ............ 494/38, 41, 53, 60, 494/85, 136; 210/360.1, 365, 372, 373, 374, 380.1, 380.3, 381, 398, 512.1, 512.3

[56] References Cited

U.S. PATENT DOCUMENTS

| | | | |
|---|---|---|---|
| 3,401,800 | 9/1968 | Stack | 210/380.3 |
| 4,313,559 | 2/1982 | Ostkamp et al. | 494/53 |
| 4,334,647 | 6/1982 | Taylor | 494/53 |
| 4,378,906 | 4/1983 | Epper et al. | 494/53 |
| 4,448,679 | 5/1984 | Dilks, Jr. et al. | 494/38 |
| 4,983,289 | 1/1991 | Salomon | 210/360.1 |
| 5,151,079 | 9/1992 | Flanigan et al. | 494/53 |

OTHER PUBLICATIONS

Tema Systems Inc. Brochure entitled "Centrifuges".

*Primary Examiner*—Robert A. Dawson
*Assistant Examiner*—David Reifsynder
*Attorney, Agent, or Firm*—Wood, Herron & Evans

[57] ABSTRACT

A self-cleaning scroll and screen centrifuge for processing a combined liquid and solid material to separate the solid material from the liquid. The centrifuge is designed for use in the food processing industry and therefore has fluid injectors for cleaning all surfaces within the centrifuge including opposed mating surfaces which function as noncontacting seal mechanisms.

31 Claims, 4 Drawing Sheets

SELF-CLEANING SCROLL AND SCREEN CENTRIFUGE

BACKGROUND OF THE INVENTION

1. Field of the Invention

The present invention relates generally to the area of food and beverage apparatus and, more particularly, to a scroll and screen centrifuge having self-cleaning components.

2. Description of Related Art

It is well known to use a scroll and screen centrifuge to separate a crystalline, a granular or a fibrous product from a liquid in which the crystalline, granular or fibrous product is carried. Scroll and screen centrifuges are typically used with a continuous process in which a combined liquid and solid material is continuously fed into and continuously discharged from the centrifuge. The continuous process is distinguished from a batch process in which a batch of liquid and solid material is fed into the centrifuge; and the liquid and solid materials are separated. The centrifuge is stopped, and the separated materials are removed before another batch is loaded into the centrifuge. Both the continuous and batch separation processes are also considered to dry the solid material. The separation process is used in a wide range of applications including the production of soap powders, coal, gypsum, plastic granules, potash, salt, etc.

In a typical scroll and screen centrifuge, a frustoconical basket and scroll assembly is mounted for rotation within a housing. Within the basket and scroll assembly, a frustoconical scroll member having a tubular side wall with outwardly projecting helical screw flights is mounted for rotation within an independently rotating frustoconical basket member; and the screen is mounted on a circumferential surface of the basket member. The scroll member rotates at a slightly greater velocity than the basket member so that the helical screw flights on the scroll member pass in close proximity to and over the screen. The helical length of the screw flights varies from a fraction of a revolution to several revolutions around the scroll member. A liquid with solids therein is fed into a closed, rearward portion of the frustoconical basket and scroll assembly. The rotation of the basket and scroll assembly creates centrifugal forces which cause the liquid to pass through openings in the screen thereby separating the liquid from the solids. The rotational velocity difference between the scroll member and screen causes the screw flights to push the solid material across the screen from the smaller, closed, rear end of the basket and scroll assembly to its larger, open, forward end from which the solid material is discharged. The processing time of the material in the centrifuge is controlled by the number and pitch of the helical screw flights on the scroll member and the difference in angular velocities between the basket and scroll members. The solid material is discharged as particles into a discharge opening and gravity and turbulence caused by the rotating basket and scroll assembly moves the solid particles through the discharge opening to other equipment or a collection unit.

Such scroll and screen centrifuge designs have a disadvantage of having limited application in the food processing industry due to the special machinery requirements for processing food and dairy products. For example, machinery used in processing dairy products should not have metal to metal contacts exposed to the dairy products. All areas of the machine that are exposed to the dairy products including seals, should be washable. There should be no places where product can collect thereby allowing bacteria to grow. Consequently, the superior performance and efficiency of a scroll and screen centrifuge for solid/liquid separation has not been widely used in the dairy industry.

SUMMARY OF THE INVENTION

To overcome the disadvantages of not being able to generally use scroll and screen centrifuges in the dairy industry, the present invention provides for a self-cleaning scroll and screen centrifuge. The invention is especially suited for use in the dairy industry in separating lactose (milk sugar) solids from whey.

According to the principles of the present invention and according to the described embodiments, a continuous worm and screen centrifuge is provided for processing a combined liquid and solid material to separate the liquid from the solid material. The centrifuge has a housing with an exterior wall having an interior surface bounding a contained volume of the housing. A basket and scroll assembly is mounted in the housing to rotate about an axis of rotation. The basket and scroll assembly has an outer wall cooperating with the interior surface of the housing to form a peripheral enclosure. The outer wall of the basket and scroll assembly includes a rear wall section cooperating with the interior surface of the housing to form a cavity. The enclosure and cavity are separated by a first noncontacting seal located between the stationary inner surface of the housing and the rotating basket and scroll assembly.

The combined liquid and solid material is fed through an open forward end of the rotating scroll member and directed to its closed rearward end at which point the combined liquid and solid material is ported through feed openings in the tubular side wall at the rear end of the scroll member to a volume between the scroll member and the independently rotating basket member. The scroll member has screw flights extending from its tubular side wall, and the screw flights have an outer edge that passes over a frustoconical screen mounted in the basket member. The rotating screw flights sweep a frustoconical shaped volume that matches the shape of the screen. Rotation of the basket member creates a centrifugal force which is effective to push the liquid through the screen and into the enclosure. The relative angular velocity of the scroll member with respect to the basket member is effective to move the solid material toward the open end of the basket member where the solid material is discharged from the basket and scroll assembly.

The centrifuge further includes a clean-in-place washing device connected to the housing for injecting a fluid into the first noncontacting seal to clean surfaces contained therein. The first noncontacting seal contains a stationary, first annular sealing surface of the housing that is directed toward and concentrically located about the axis of rotation. The noncontacting seal mechanism further includes a plurality of rings extending from the outer wall of the rotating basket and scroll assembly toward the exterior wall of the housing. The plurality of rings is adjacent to and contiguous with the first annular sealing surface of the housing. The noncontacting seal mechanism further includes an annular slinger adjacent the plurality of rings and extending from the outer wall of the rotating basket and scroll assembly toward the exterior wall of the housing. The annular slinger is located adjacent a stationary, second annular sealing surface on the housing extending from the first sealing surface toward the exterior wall of the housing. The rotating slinger operates to prevent material from passing the slinger and entering the space between the slinger and the second annular sealing surface of the housing. The washing device includes fluid conducting passages extending through the exterior wall of the housing and terminating with orifices on the first sealing surface of the housing for cleaning surfaces within the first noncontacting seal.

The basket member and the scroll member each have integral hubs centrally located therein which are engaged with respective outer and inner rotary drives. The centrifuge further includes a second noncontacting seal connected between the rear wall section of the housing and the hub of the basket member. There is a also a contacting seal connected between the hub of the basket member and the hub of the scroll member. The centrifuge further includes a third noncontacting seal at the front side of the housing between the housing and the basket and scroll assembly. The third noncontacting seal is effective to separate the peripheral enclosure in the housing from the open end of the basket and scroll assembly.

A second washing device is connected to the housing to inject fluid proximate the third noncontacting seal to clean surfaces within that seal. Other washing apparatus is connected to the housing to inject fluid between the rear side of the scroll member and the rear wall section of the basket member to clean surfaces located therebetween. Washing nozzles are also located in the peripheral enclosure and inside the scroll member to clean the interior surfaces of the basket and scroll assembly. In addition, the design of the discharge of separated solids has been optimized to minimize the accumulation of separated solids within the centrifuge.

All surfaces in contact with the food being processed may be cleaned-in-place, and all such surfaces are oriented vertically downward such that they drain freely. Other than the contact between the screen and the internal surfaces of the basket in which the screen is mounted, the construction of the centrifuge of the present invention eliminates all metal-to-metal contact or joints between metallic surfaces in contact with the food being processed. Therefore, the present invention has an advantage of providing a self cleaning or clean-in-place scroll and screen centrifuge that may be used for processing a wide range of products in the dairy industry. Use of the scroll and screen centrifuge in the separation of lactose solids from whey provides the advantage of providing a lactose solids that have only 4%–8% moisture versus 10%–15% moisture using other techniques. Consequently, there is an advantage in that the further drying of the lactose solid requires less energy. In addition, the snow-like output of the lactose solid from the scroll and screen centrifuge has a smaller more consistent particle size which requires less downstream processing.

These and other objects and advantages of the present invention will become more readily apparent during the following detailed description in conjunction with the drawings herein.

DETAILED DESCRIPTION OF THE INVENTION

Figure 1:
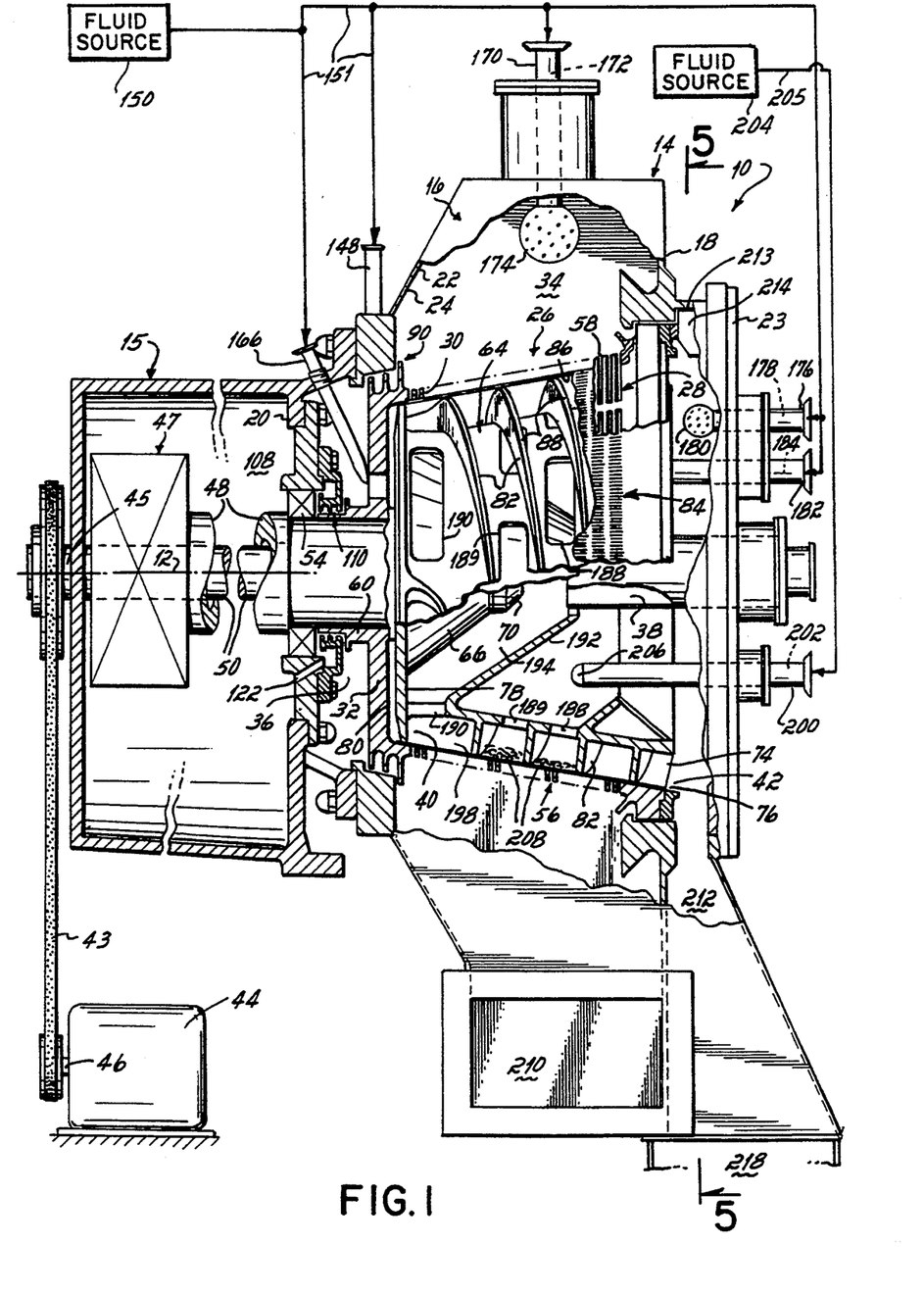
FIG. 1 is a cut-away partial perspective and centerline cross-sectional view of the scroll and screen centrifuge of the present invention.
Figure 2:
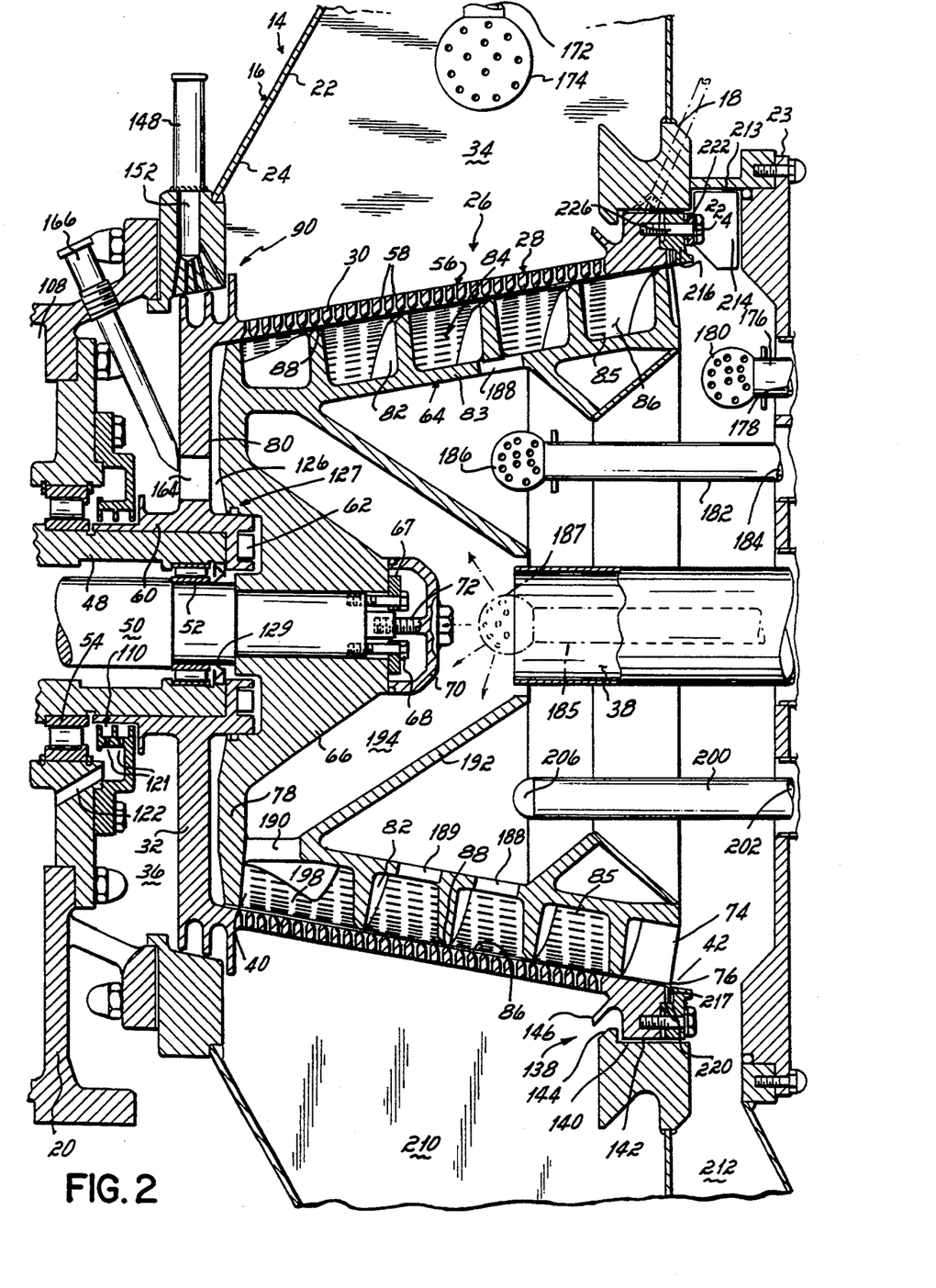
FIG. 2 is a centerline cross-sectional view of the scroll and screen centrifuge of the present invention.
Figure 3:
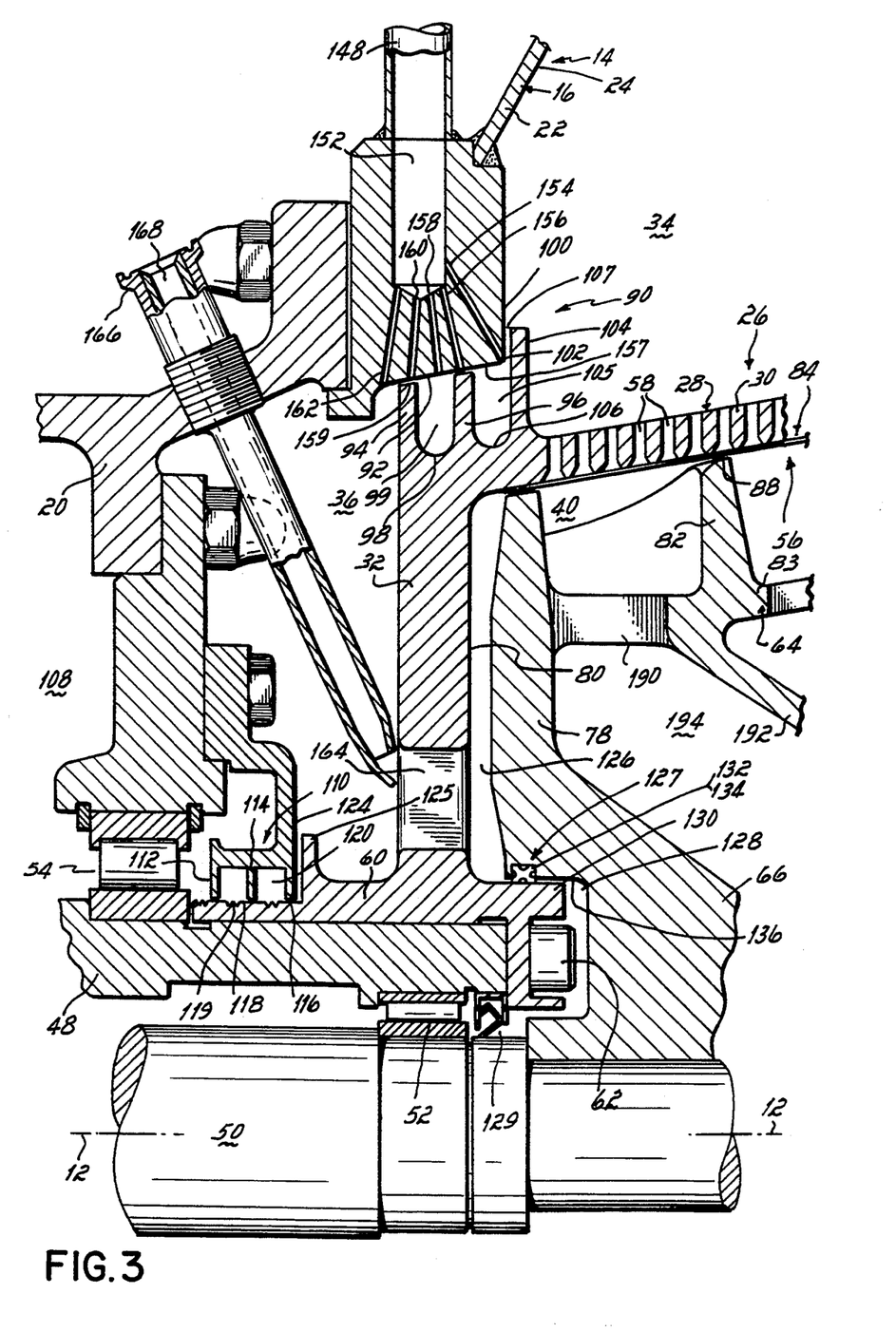
FIG. 3 is an enlarged view of the seals at the back of the basket and scroll assembly.

FIGS. 1, 2 and 3 are views illustrating a continuous scroll and screen centrifuge 10. Referring to FIG. 1, the illustrated centrifuge 10 is a horizontal machine in that the rotating components turn about a horizontal axis of rotation 12. The centrifuge is comprised of a discharge housing 14 that is mounted to a drive housing 15. The discharge housing 14 has an exterior wall 16 which includes a front wall 18 and a peripheral wall 22 located between the front wall 18 and an end wall 20 of the drive housing 15. The front wall 18 of the discharge housing 14 includes a cover 23 which permits access to the interior of the centrifuge. Further, the exterior wall 16 has an interior surface 24 bounding the contained volume of the discharge housing 14.

A basket and scroll assembly 26 is rotatably mounted within the discharge housing 14. The scroll and assembly 26 has an outer wall 28 comprised of a circumferential wall section 30 and a rear wall section 32. The circumferential wall section 30 cooperates with the interior surface 24 of the exterior wall 16 of the discharge housing 14 to form an enclosure 34 therebetween. The rear wall section 32 of the basket and scroll assembly 26 cooperates with the exterior wall 16 of the discharge housing 14 to form a cavity 36 therebetween. The combined liquid and solid material is fed into the centrifuge 10 through a feed tube 38 to a wet end, or rear end, 40 of the basket and scroll assembly 26. Rotation of the basket and scroll assembly 26 results in liquid being discharged through the outer wall 28 into the enclosure 34 and the solid material being discharged from the dry end, or front end, 42 of the basket and scroll assembly 26.

The centrifuge is powered by a motor 44 which is mechanically coupled by a belt 43 extending between a rotating output shaft 46 to an input shaft 45 of a multiple shaft drive 47. The input shaft is connected to internal gearing which produces a first rotary drive by driving the outer drive shaft 48 at a first angular velocity, for example, 2200 rpm. The multiple shaft drive 47 provides a second rotary drive via internal gearing to drive the inner shaft 50 at a second velocity, for example, 2250 rpm, which is greater than the first velocity by a predetermined factor. The inner drive shaft 50 is rotatably mounted within the outer drive shaft 48, and the outer and inner drive shafts 48, 50 are concentrically located about the axis of rotation 12. The inner drive shaft 50 is coupled to the outer drive shaft 48 by bearings 52 (FIG. 2), and the outer drive shaft 48 is rotatably coupled to a drive housing 15 by bearings 54. Consequently, the motor 44 and multiple shaft drive 47 are effective to provide independent rotary drives that have different angular velocities.

Referring to FIGS. 1 and 2, the basket and scroll assembly 26 is comprised of a basket member 56 having a plurality of slots 58 arranged in a grid on its outer wall 28. The basket member has an integral hub 60 which is centrally located in the rear wall section 32 of the basket member 56 and is mechanically connected to the outer drive shaft 48 by bolts 62. Therefore, basket member 56 is mounted within the discharge housing 14 to rotate about the axis of rotation 12. A scroll member 64 has an integral hub 66 which is centrally located within the end wall 67 of the scroll member 64 and is mechanically connected to the inner drive 50 by a key (not shown) and retained by bolts 68. A cap 70 having an integral threaded stud 72 is removably connected to the shaft 50 thereby permitting access to the bolts 68 which secure retaining plate 67 to the shaft 50. The scroll member 64 has an open front end 74 adjacent an open end 76 of the basket member 56. Similarly, the scroll member 64 has a tubular side wall 83 and a rear end wall 78 closing one end of the tubular side wall 83 adjacent a closed end 80 of the basket member 56.

Screw flights 82 extend outwardly from a tubular side wall 83 of scroll member 64, and the screw flights extend helically relative to the axis of rotation 12 between the front and rear ends, 74, 78, respectively, of the scroll member 64. The rear end wall 78 extends outwardly from the tubular side wall 83 and connects with one end of the screw flights 82. The basket member 56 has mounted therein a peripheral screen 84 having slots or perforations 85 extending therethrough and an inner surface 86 directed toward the axis of rotation 12. The width of the perforations is preferably 90 microns (0.09 mm) with an open screen area of 7.5% of the total screen area. Each of the screw flights 82 has a peripheral edge 88 which, upon rotation of the scroll member, moves in close proximity to and relative to the inner surface 86 of the screen 84. There is a clearance of approximately 0.5 mm to 0.8 mm between the outer edges 88 of the screw flights 82 and the inner surface 86 of the screen 84. The peripheral screen 84 has a frustoconical shape, and the outer edges 88 of the helical screw flights 82 define a mating frustoconical shape. Therefore, rotation of the scroll member 64 causes peripheral edges 88 to sweep a boundary of a frustoconical volume mating with the frustoconical shape of the peripheral screen.

For application in the food processing industry, it is necessary that, to the greatest extent possible, the materials being processed be contained within the machine and not exposed to foreign material. The majority of the liquid being separated passes through the outer wall 28 of the basket and scroll assembly close to the rear wall section 32. Therefore, the centrifuge contains a first noncontacting seal 90 for separating the enclosure 34 from the cavity 36 and inhibiting the flow of liquid therebetween. Referring to FIG. 3, the seal has a stationary, first housing sealing surface 92 which extends from the interior surface 24 of the exterior wall 16 and is directed toward and concentrically located about the axis of rotation 12. The first housing sealing surface 92 is preferably a frustoconical surface that flares outwardly toward the front end of the housing preferably at an angle of 10° with the axis of rotation. Therefore, fluid on the first sealing surface 92 is be driven toward the enclosure 34 by the air currents produced by the rotating basket and scroll assembly 26. The first noncontacting seal 90 further includes a first ring 94 extending from the outer wall 28 of the rotating basket member 56, and the rotating first ring 94 is proximate the rear wall section 32 of the outer wall 28 of the basket and scroll assembly 26. The first ring 94 is contiguous with, but does not contact, the first sealing surface 92. The first noncontacting seal further includes a second ring 96 extending from the rotating basket member 56. The rotating second ring 96 is parallel to the first ring 94 and extends radially toward the exterior wall 16 of the discharge housing 14. The first and second rings 94, 96 are joined at the circumferential wall section 30 by a curved surface 98, thereby forming a first annular groove 99 therebetween. There is a clearance of approximately 0.5 mm between the first and second rings 94, 96 and the first housing sealing surface 92.

The first noncontacting seal additionally has a stationary, annular, second housing sealing surface 100 extending from a front edge 102 of the first housing sealing surface 92 toward the exterior wall 16 of the discharge housing 14. An annular, first slinger 104 is connected to the rotating basket and scroll assembly 26 adjacent to the second ring 96 and is joined thereto by a curved surface 106 along the circumferential wall section 30 on the rotating basket member 56, thereby forming a second annular groove 105 therebetween. The first slinger 104 extends from the outer wall 28 toward the exterior wall 16 of the discharge housing 14 radially past the front edge 102 of the first housing sealing surface 92 in a direction adjacent and parallel to the second housing sealing surface 100. Rotation of the first slinger 104 with respect to the second housing surface 100, creates outwardly directed radial fluid currents made up of either the liquid or air contained within the enclosure 34. Those outwardly directed fluid currents are effective to inhibit fluid from flowing from the enclosure 34 to the cavity 36 via the space 107 between the second housing sealing surface 100 and first slinger 104. Therefore, the housing sealing surfaces 92, 100, rings 94, 96, curved surfaces 98, 106, annular grooves 99, 105 and first slinger 104 cooperate to form the noncontacting labyrinth seal 90 for separating the enclosure 34 from the cavity 36 thereby inhibiting flow of the liquid from the enclosure 34 to the cavity 36.

It is also desirable to isolate the cavity 36 from the chamber 108 in which the drive mechanics and a lubricant are located. The lubricant in the chamber 108 may slip past bearings 54 and into the cavity 36. Therefore, a second noncontacting seal 110 is comprised of stationary, generally vertical, rings 112, 114, 116 which are connected to the discharge housing 14 and are concentrically located about and directed toward the axis of rotation 12. The rings are contiguous with a rotating cylindrical sealing surface 118 on the hub 60 of the basket member 56. The cylindrical sealing surface 118 has grooves 119 which interrupt the migration of lubricant from the chamber 108 long the surface 118. The rotation of the basket member 56 causes the lubricant to be thrown off the outer edges of the grooves 119 into one of the two labyrinth cavities 120. Referring to FIG. 2, gravity pull the lubricant to the bottom surface of the labyrinth cavities 120, through the drain holes 1 21 and through the return hole 122 which carries the lubricant back to the chamber 108. Referring to FIG. 3, a stationary, third annular housing sealing surface 124 extends perpendicular to the hub sealing surface 118. An annular, second slinger 125 is connected to the hub 60 of the rotating basket member 56 and extends outward toward the exterior wall 16 of the discharge housing 14 adjacent and parallel to the third housing sealing surface 124. Again, rotation of the second slinger 125 relative to the stationary third housing sealing surface 124 creates fluid currents that inhibit the flow of liquid from the cavity 36 into the space between the stationary third housing sealing surface 124 and the rotating second slinger 125.

The space 126 located between the rear end 78 of the scroll member 64 and the closed end 80 of the basket member 56 must be protected from the lubricant in the chamber 108 leaking through the bearings 54. Therefore, a first contacting lip seal 129 is used between the outer and inner shafts 48, 50. In addition, a second contacting seal 127 is created within an annular recess 128 centrally located within the rear end of the hub 66 the rotating scroll member 64 concentrically located about the axis of rotation 12. An annular flange 130 is centrally located on a forward directed surface of the hub 60 of the rotating basket member 56. The annular flange 130 is concentrically located about the axis of rotation 12 and extends from the rear wall section 32 of the basket member 60 toward its open end 76. The annular flange 130 of the basket member 56 is received within the annular recess 128 of the scroll member 64. A square shaped, or quad, Q-ring 132 is located within a groove 134 of the sidewall 136 of the rotating annular recess 128. The quad O-ring 132 is commercially available from Minnesota Rubber of Minneapolis, Minn. The rotating O-ring 132 in the rotating annular recess 128 makes sealing contact with the rotating annular flange 130 thereby sealing the space 126 from the chamber 108.

Referring to FIG. 2, a third noncontacting seal 138 is located between the discharge housing 14 and the basket member 56 close to the front wall 18 of the discharge housing 14. The third noncontacting seal is comprised of a stationary, cylindrical, fourth housing sealing surface 140 which is directed toward and located concentrically about the axis of rotation 12. The outer wall 28 of the rotating basket member 56 has a mating, rotating cylindrical surface 142 adjacent the open front end 76 of the basket member 56. A stationary, fifth housing sealing surface 144 is located adjacent and parallel to a rotating annular third slinger 146 extending from the outer surface 28 of the rotating basket member 56. The fifth housing sealing surface 144 cooperates with the third slinger 146 and the opposed noncontacting surfaces 140, 142 to inhibit the flow of liquid from the enclosure 34 to open end 76 of the basket member 56.

It is necessary that the centrifuge 10, when used for processing food materials, be able to be cleaned in place. Preferably, that cleaning should be implemented without requiring the disassembly of components of the centrifuge 10. Therefore, the present invention has the additional advantage of being self-cleaning. Referring to FIG. 3, a first fluid injector 148 is located in the discharge housing 14 at the first noncontacting seal 90. The first fluid injector 148 is connected to an external fluid source 150 (FIG. 1) by fluid lines 151. The first fluid injector 148 has a first fluid passage 152 (FIG.3) which branches into fluid passages 154, 156, 158, 160 and 162. The fluid passages 154 and 158 terminate at orifices on the first housing sealing surface 92 and inject fluid into the spaces 99, 105 for cleaning the surfaces of the first slinger 104 and rings 94, 96 and curved surfaces 98, 106. The fluid passages 156, 160 terminate at orifices on the first housing sealing surface 92 and are effective to inject fluid in the space between the first housing sealing surface 92 and the opposing annular edge surfaces 157, 159 of the rings 96, 94, respectively, thereby cleaning those edge surfaces. The fluid passage 162 injects fluid into the cavity 36 and is effective to clean the surfaces bounding the cavity 36 which are part of the exterior wall 16 of the discharge housing 14, rear wall section 32 and hub 60 of basket member 56.

The rear wall section 32 of the basket member 56 contains an opening 164 providing access to the space 126 bounded by the closed end 80 of the basket member 56 and the rear end 78 of the scroll member 64. A second fluid injector 166 contains a fluid passage 168 which provides fluid from the fluid source 150 (FIG. 1) via fluid lines 151 through the second fluid injector 166 through the opening 164 and into the space 126 for washing the surfaces bounding the space 126.

Referring to FIG. 1, a third fluid injector 170 is connected to the fluid source 150 by fluid lines 151 and extends through the peripheral wall 22 of discharge housing 14. The third fluid injector has a fluid passage 172 terminating at a nozzle 174 which is effective to spray fluid onto all surfaces bounding the enclosure 34 thereby cleaning those surfaces. A fourth fluid injector 176 is connected to the fluid source 150 and by fluid lines 151 has an internal passage 178 terminating with a fluid nozzle 180 which is effective to spray cleaning fluid on the internal surfaces of the front side of the centrifuge 10. The third noncontacting seal 138 is at the dry end of the centrifuge; and therefore, with its construction, it should accumulate little or no liquid or solid material between its mating surfaces 140, 142. However, during the cleaning process the fluid sprays from the nozzles 174, 180 are effective to circulate cleaning fluid between the surfaces 140, 142 of the third noncontacting seal 138. Referring to FIG. 2, a fifth fluid injector 182 is connected to the fluid source 150 (FIG. 1) by fluid lines 151 and has a fluid passage 184 terminating at a spray nozzle 186. The fifth fluid injector is effective to spray cleaning fluid on the internal surfaces of the rotating scroll member 64. The tubular side wall 83 of the scroll member 64 has three circumferential groups of openings 188, 189 and 190 at different positions along the axis of rotation 12. Cleaning fluid from nozzle 186 passes through openings 188 and 189. Prior to initiating the cleaning process, a sixth fluid injector 185, shown in phantom, is connected to the fluid source 150 and is inserted into the feed tube 38. Cleaning fluid from nozzle 187 passes through feed openings 190. Consequently, all of the surfaces of the basket and scroll assembly 26 and the housing 14 in contact with the liquid and solid material may be cleaned in place without disassembling the centrifuge 10.

In use, for example, in the application of separating lactose (milk sugar) solids from whey, the motor 44 drives the basket and scroll assembly in a clockwise direction as viewed from the front of the centrifuge. The basket member rotates at, for example, 2200 rpm, and the scroll member rotates at, for example, 2250 rpm. Referring to FIG. 2, the mother liquor which is a combination of the whey and lactose solids is continuously fed into the centrifuge 10 through feed tube 38. The feed tube 38 directs the mother liquor to the central portion 193 of the rotating scroll member 64 which has a conical baffle 192 which, with the hub 66, provides a flow path or channel 194 at the closed end of the scroll member 64. At the other end of the flow channel 194, the scroll member 64 contains a first group of circumferential openings 190 through which the mother liquor flows into a volume 198 bounded by the rear end 78, the frustoconical tubular side wall 83 and the screw flights 82 of the scroll member 64 and the inner surface 86 of the peripheral screen 84. The screw flights 82 are effective to hold the combined whey and lactose solids at the closed end of the scroll member 64. The angular velocity of the basket and scroll assembly 26 creates centrifugal forces which drive the liquid whey through the perforations 85 of the peripheral screen 84, through the slots 58 of the basket member 56 and into the enclosure 34. Approximately 90% of the liquid whey passes through the peripheral screen over the first 25% of the length of the screw flights 82 in moving from the closed end 80 to the open end 76 of the basket member 56.

The angular velocity of the rotating scroll member is faster than the angular velocity of the basket member. The difference in angular velocities between the scroll member 64 and basket member 56 is effective to cause the lactose solid material to move along the leading front edge 88 of the screw flights 82 and across the inner surface 86 of the peripheral screen 84 toward the open end 76 of the basket member 56. A seventh fluid injector 200 has an internal passage 202 connecting spray nozzle 206 to a fluid source 204 (FIG. 1) by fluid line 205. The fluid injector 200 sprays a cleaning solution such as water onto the lactose solid material 208 moving toward the open end 76 of the basket member 56 to rinse off the mother liquor whey. The spinning action of the basket and scroll assembly 26 drives the cleaning fluid from the nozzle 206 into the enclosure 34 prior to the lactose material reaching the open end 76 of the basket member 56.

Figure 4:
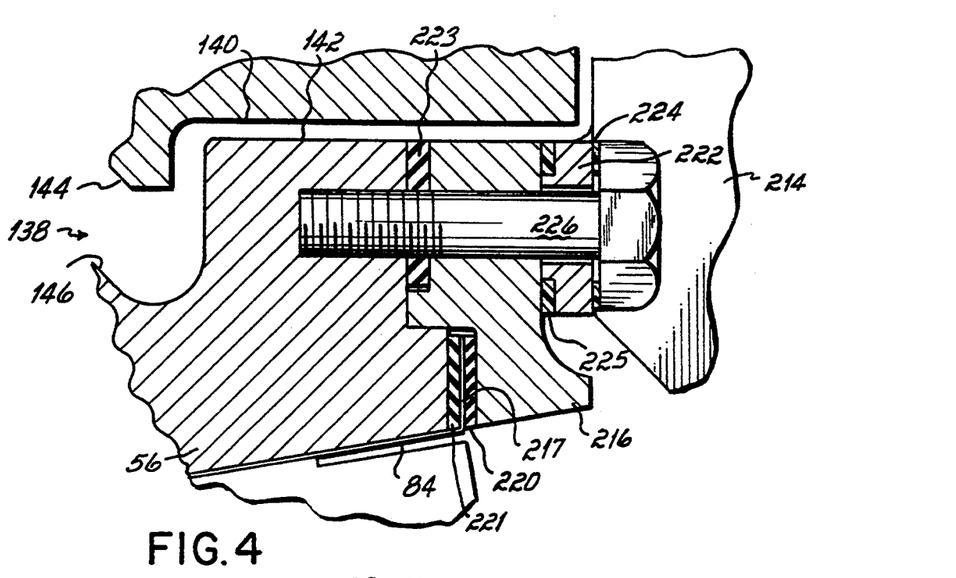
FIG. 4 is an enlarged view of the seal at the front of the basket and scroll assembly.

Referring to FIGS. 1 and 4, centrifugal forces from the rotating basket drive the liquid centrate through the screen 84 and into the enclosure 34. The liquid centrate is moved by the centrifugal forces and turbulence from the rotating basket and scroll assembly into a collection unit 210. The lactose particles are discharged as fine snow-like particles which are uniform in size and dry and they do not collect together as clumps of particles in the discharge chute 212. However, referring to FIGS. 2 and 4, the lactose solid particles may collect on the interior surfaces 213 of an annular discharge channel 215 of the front wall 18 of the discharge housing 14. Four cleaning blades, one of which is shown as cleaning blade 214, are mounted to a clamp ring 216 bolted to the front side of the basket member 56 and are effective to sweep the lactose solid particles from the interior surfaces 213 of the discharge channel 215 of the discharge housing 14. Therefore, the cleaning blades minimize the build up of solid particles on the interior surfaces 213. The clamp ring 21 6 is used to secure the peripheral screen 84 within the basket member 56. A forward lip 217 of the screen 84 is formed over the front edge of the basket member 56. A first neoprene gasket 220 is located between the forward lip 21 7 of the screen 84 and the ring clamp 216, and a second neoprene gasket 221 is located between the forward lip 217 of the screen 84 and the front side of the basket member 56. The first and second white neoprene gaskets 220, 221 are preferably 0.03125 inches (0.824 mm) thick. A third white neoprene gasket 223 preferably 0.0625 inches (1.65 mm) thick is located between the clamping ring 216 and the basket member 56. A teflon gasket 225 is located between the mounting flange 222 of the cleaning blade 214 and the clamping ring 216. The teflon gasket 225 is preferably 0.005 inches (0.123 mm) thick, and the thickness of the teflon gasket 225 is in a range of from 0.005 inches (0.132 mm) to 0.020 inches (0.528 mm). A nylon washer 224 is located under the head of cap screw 226 securing the mounting flange 222, the clamp ring 216 and the forward lip 217 of the screen 84 to the forward side of the basket member 56.

Figure 5:
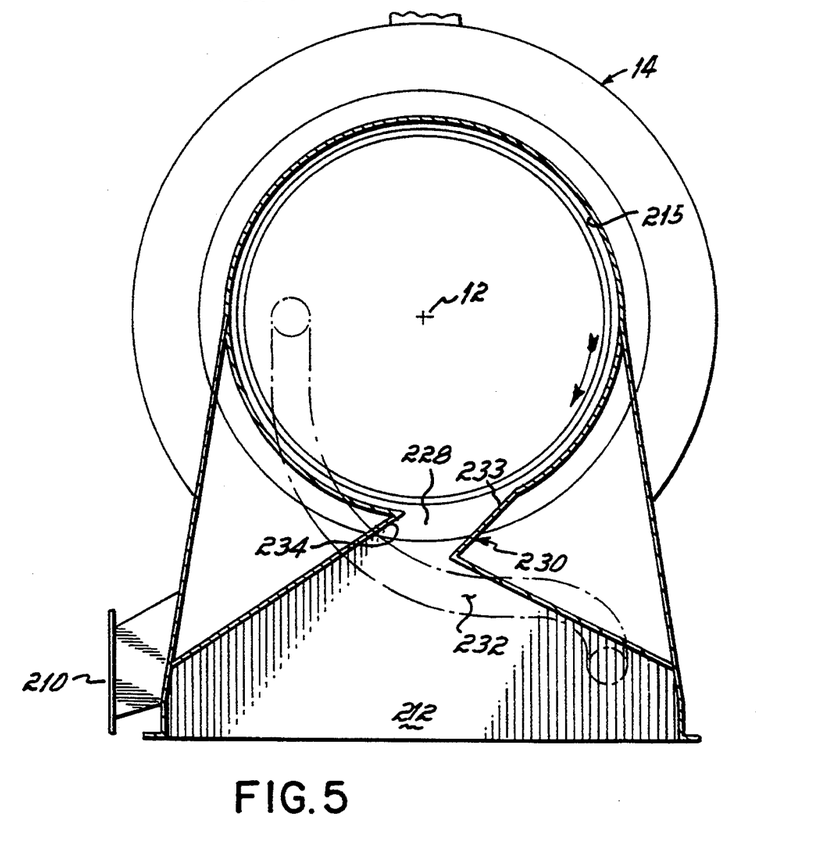
FIG. 5 is a partial cross-sectional end view of the scroll and screen centrifuge taken on line 5—5 of FIG. 1.

FIG. 5 illustrates the relationship between the annular discharge channel 215 and the generally vertical discharge chute 212. It is assumed that the basket and scroll assembly 26 is rotating in the clockwise direction as viewed in FIG. 5. Prior scroll and screen centrifuges principally use two designs. In a first design, the discharge channel is semicircular and intersects the discharge chute at points approximately defined by a horizontal diameter passing through the axis of rotation 12. The discharge chute width is equal to the diameter of the discharge channel; and therefore, the discharge channel has vertical side walls proximate the vertical side walls of the centrifuge. With this first design, solid material impinges and accumulates on the left hand vertical side wall of the discharge chute as viewed in FIG. 5. In a second design, a vertical discharge chute tangentially intersects the annular discharge channel on the right side of the annular discharge channel at points on the horizontal diameter of the discharge channel. With the second design, the annular discharge channel has a circumferential fluid collection point vertically below the discharge chute in which fluid can accumulate.

As shown in FIG. 5, the present invention overcomes the disadvantages of the prior designs by providing a generally vertical discharge chute 212 intersecting the annular discharge channel 215 to form a discharge opening 228 at circumferentially the lowest point of the annular discharge channel 215. Further, the discharge chute 212 has an upper section 230 which intersects the annular discharge channel 215 approximately tangentially. Therefore, the solid lactose particles are moved by the cleaning blades 214 directly into the upper section 230 of the discharge chute 212. The turbulence created by the rotating basket and scroll assembly 26 is effective to move the solid lactose particles through the upper section 230 into the wider lower section 232 of the discharge chute 212. The discharge opening 228 created by the intersection of the discharge chute 212 with the annular discharge channel 215 is rectangular; and the width of the discharge opening is approximately equal to the width of the annular discharge channel 215 as measured in a direction parallel to the axis of rotation 12. Further, the length of the rectangular opening 228 is substantially less than the diameter of the annular discharge channel 215. Preferably, the circumferential length of the discharge opening 228 is approximately 30% of the diameter of the annular discharge channel 215. The upper section 230 of the discharge chute 212 is oblique to the vertical. Therefore, a first side 233 of the discharge opening 228 in the upper section 230 is approximately tangential to the annular discharge channel 215. However, an opposite side 234 of the discharge opening 228 in the upper section 230 forms an acute angle with the annular discharge channel 215. As illustrated in FIGS. 1 and 5, all surfaces in the annular discharge channel 215 and the discharge chute 212 have a vertically downward slope; and therefore, those surfaces drain freely and do not accumulate fluid. An air recirculation pipe is connected between the right hand side of the discharge chute to the front of the centrifuge. The source of the recirculation air is from an area of the discharge chute in which the air is dry and there is minimal flow of air and solid material.

The components of the centrifuge 10 which are in contact with the material being processed are made of 316L stainless steel. All machined surfaces have a 32 finish, and all surfaces on fabricated parts are polished to a 150 grit. The metallic housing, metallic basket member and metallic scroll member are constructed and interconnected such that with the exception of the contact of the screen with the internal surface of the basket member no metallic surface inside the centrifuge which contacts the liquid and solid material is in metal-to-metal contact with another metallic surface also in contact with the liquid and solid material. As illustrated in the drawings, the centrifuge is further constructed such that all metallic surfaces of the housing, basket member and scroll member in contact with the liquid and solid material being processed are oriented in a vertically downward direction so that they drain freely.

After a predetermined period of use which may be measured in hours, days or weeks, the input of the mother liquor is stopped, and the machine is cleaned in place without disassembly. The cleaning process may require cleaning the centrifuge with a succession of different fluids such as an acid solution, a caustic solution and water. The fluid source 150 contains or is connected to the sources of the required solutions, and under automatic or manual control the appropriate solutions are fed through the feed lines 151, through the fluid injectors and into the centrifuge 10. Consequently, the scroll and screen centrifuge of the present invention may be used in those applications, such as food processing where the clean-in-place capability is required.

While the invention has been set forth by the description of the embodiments in considerable detail, it is not intended to restrict or in any way limit the claims to such detail. Additional advantages and modifications will readily appear to those who are skilled in the art. For example, the first housing sealing surface 92 may be a cylindrical surface instead of the preferred frustoconical shape. Further, the first housing sealing surface 92 may be located in a direction approximately perpendicular to the axis of rotation 12 and similarly the rings 94, 96 may be reoriented so that they are contiguous with the reoriented and approximately vertical first housing sealing surface. The spacial orientation of the annular slingers 104, 125 and their cooperating surfaces 100, 124, respectively, may be changed to any direction which is effective to inhibit the flow of liquid between the slinger and its cooperating surface. Further, the third noncontacting seal 138 may have a fluid injector injecting fluid directly into the seal in a manner similar to the construction of the first fluid injector 148 and as shown in phantom in FIG. 2.

In addition, the configuration of the annular recess and stub used to provide opposed mating surfaces for the contacting seal 127 may be reversed. In that case, the annular flange 130 would be located on the rear side of the hub 66 of the scroll member 64 and the annular recess would be located in the hub 60 of the basket member 56.

The frustoconical basket and scroll assembly requires that the peripheral leading edges 88 of the screw flights 82 and the interior surface 86 of the screen 84 have a desired mating frustoconical shape. However, the outer wall 28 of the basket member 56 and the tubular side wall 83 of the scroll member 64 may have the same or different frustoconical shapes or other shapes, such as a cylindrical shape, that is consistent with the operation of the scroll and screen centrifuge. Alternatively, a cylindrical basket and scroll assembly may be used in which the interior surface 86 of the screen 84 and the peripheral leading edges 88 of the screw flights 82 have a cylindrical shape.

The multiple shaft drive 47 may be driven at different speeds by independent input shafts connected to multiple pulleys or gears mounted on the output drive shaft 46 of the motor 44. Further, the basket and scroll assembly is preferably oriented to rotate about a horizontal axis of rotation, however, the basket and scroll assembly may be constructed to rotate about a vertical axis of rotation. The invention, in its broadest aspects, is therefore not limited to the specific details shown and described. Accordingly, departures may be made from such details without parting from the spirit or scope of the general inventive concept.

What is claimed is:

1. A centrifuge for processing a combined liquid and solid material to separate the liquid from the solid material comprising:

a housing having an exterior wall including a front wall and an end wall and a peripheral wall disposed therebetween and an interior surface bounding a contained volume within said housing, a frustoconical basket and scroll assembly mounted in said housing to rotate about an axis of rotation, said frustoconical basket and scroll assembly having an outer wall cooperating with said peripheral wall of said housing to form an enclosure therebetween, said enclosure receiving liquid that is separated from the solid material, and said outer wall of said frustoconical basket and scroll assembly including a rear wall section cooperating with said end wall of said housing to form a cavity therebetween;

first noncontacting seal means connected between said housing and said frustoconical basket and scroll assembly for separating said enclosure from said cavity, thereby inhibiting a flow of liquid between said enclosure and said cavity; and means connected to said housing for injecting a fluid into said first noncontacting seal means between said housing and said frustoconical basket and scroll assembly for cleaning said noncontacting seal means.

2. The centrifuge of claim 1 wherein said first noncontacting seal means further comprises:

an annular first housing sealing surface extending from said exterior wall proximate said end wall of said housing and directed toward and concentrically located about said axis of rotation; and a ring extending outwardly toward said exterior wall of said housing from said outer wall proximate said rear wall section of said outer wall, said ring being contiguous with said first housing sealing surface.

3. The centrifuge of claim 2 wherein said first noncontacting seal means further comprises:

a frustoconical annular first sealing surface extending from said exterior wall proximate said end wall of said housing and directed toward and concentrically located about said axis of rotation, said frustoconical annular first sealing surface flaring outwardly toward said front wall of said housing; and a plurality of rings extending radially outward from said outer wall proximate said rear wall section thereof toward and contiguous with said frustoconical annular first sealing surface.

4. The centrifuge of claim 3 wherein said noncontacting seal means further comprises:
  an annular second housing sealing surface extending from a front edge of said first housing sealing surface toward said exterior wall of said housing; and
  an annular first slinger adjacent said plurality of rings and extending from said outer wall toward said exterior wall of said housing past said front edge of said first housing sealing surface in a direction adjacent and parallel to said second housing sealing surface.

5. The centrifuge of claim 4 wherein said outer wall of said frustoconical basket and scroll assembly further comprises a circumferential wall section located concentrically about said axis of rotation, and said first housing sealing surface extends from said peripheral wall of said exterior wall and said ring extends from said circumferential wall section of said outer wall of said basket and scroll assembly.

6. The centrifuge of claim 5 wherein said plurality of rings are joined at said circumferential wall section of said outer wall by a curved surface.

7. The centrifuge of claim 8 wherein said curved surface has a radius of at least 0.25 inches.

8. The apparatus of claim 1 wherein said means for injecting further comprises a fluid conducting passage extending through said housing to said first housing sealing surface.

9. The apparatus of claim 8 wherein said means for injecting further comprises a plurality of fluid conducting passages extending through said housing to said first housing sealing surface.

10. The centrifuge of claim 1 wherein said centrifuge includes a hollow outer rotary drive and an inner rotary drive concentrically rotating within and relative to the outer rotary drive and said frustoconical basket and scroll assembly further comprises:
  a basket member mounted within said housing and connected to the outer rotary drive to rotate about said axis of rotation, said basket member having an open end and a closed end and a frustoconical peripheral screen with an inner surface; and
  a scroll member mounted within said basket member and connected to the inner rotary drive to rotate about said axis of rotation relative to said basket member, said scroll member having
  a tubular side wall having a front end and a rear end adjacent said open and closed ends, respectively, of said basket member,
  a helical screw flight extending outward from said tubular side wall and extending between said rear end and said front end of said scroll member, said screw flight having an edge moving in close proximity and relative to said inner surface of said peripheral screen, whereby rotation of said edge of said screw flight of said scroll member sweeps a volume having a frustoconical shape.

11. The centrifuge of claim 10 wherein said basket member has a centrally located integral hub connected to the outer rotary drive and said scroll member has a centrally located integral hub connected to said inner drive.

12. The centrifuge of claim 11 wherein said end wall of said housing has a hole through which said outer and inner rotary drives extend and the centrifuge further comprises a second noncontacting seal connected between said end wall of said housing and said hub of said basket member.

13. The centrifuge of claim 12 wherein said second noncontacting seal further comprises
  an annular third housing sealing surface extending toward said peripheral wall of said housing; and
  an annular second slinger connected to said hub of said basket member and extending toward said exterior wall of said housing in a direction adjacent and parallel to said third housing sealing surface.

14. The centrifuge of claim 11 further comprising a contacting sealing means connected between said hub of said basket member and said hub of said scroll member.

15. The centrifuge of claim 14 wherein said hub of said scroll member has a annular recess concentrically located about said axis of rotation and said hub of said basket member has a annular flange concentrically located about said axis of rotation extending into said annular recess of said basket member and said contacting sealing means is located between said annular flange and said annular recess.

16. The centrifuge of claim 10 wherein said centrifuge further comprises fourth means for injecting fluid located at the open end of said scroll member for injecting fluid into said scroll member to clean interior surfaces of said basket member and said scroll member.

17. The centrifuge of claim 10 further comprising fifth means for injecting fluid located within said enclosure for injecting fluid into said enclosure to clean surfaces within said enclosure.

18. The centrifuge of claim 10 wherein said closed end of said basket member has an opening and the centrifuge further comprises second means for injecting a fluid through said opening to clean surfaces located between said closed end of said basket member and said rear end of said scroll member.

19. The centrifuge of claim 1 further comprising a third noncontacting sealing means located between said housing and said basket and scroll assembly proximate said front wall of said housing.

20. The centrifuge of claim 19 further comprising a third means for injecting fluid proximate said third noncontacting sealing means to clean said third noncontacting sealing means.

21. A centrifuge for processing a combined liquid and solid material and separating the liquid from the solid material comprising:
  a housing having
    front and rear walls,
    an exterior wall disposed between said front and end walls, and said front and end walls and said exterior walls defining an interior surface bounding a contained volume within said housing,
    an annular first housing sealing surface directed toward and concentrically located about an axis of rotation, and
    an annular second housing sealing surface extending from a front edge of said first housing sealing surface toward said exterior wall of said housing;
  a frustoconical basket and scroll assembly mounted within said housing to rotate about said axis of rotation, said frustoconical basket and scroll assembly having
    a circumferential wall section of an outer wall cooperating with said interior surface of said housing to form an enclosure therebetween, said enclosure receiving the liquid that is separated from the solid material, a rear section of said outer wall cooperating with said interior surface of said housing to form a cavity therebetween, a plurality of rings extending radially toward said exterior wall of said housing from said circumferential section of said outer wall proximate said rear section of said outer wall, said plurality of rings being contiguous with said first housing sealing surface, and an annular first slinger adjacent said plurality of rings and extending from said circumferential wall section of said outer wall toward said exterior wall of said housing in a direction adjacent and parallel to said second housing sealing surface, whereby said plurality of rings, said first slinger and said first and second housing sealing surfaces cooperating to form a first noncontacting seal separating said enclosure from said cavity, thereby inhibiting the flow of liquid from said enclosure to said cavity; and a plurality of fluid passages extending through said housing and terminating at said first housing sealing surface for injecting a cleaning fluid between said first housing sealing surface and said plurality of rings.

22. A centrifuge for processing a combined liquid and solid material and separating the liquid from the solid material, the centrifuge including a housing having an interior surface bounding a contained volume of the housing, the centrifuge further including a frustoconical basket and scroll assembly mounted for rotation within said housing, said frustoconical basket and scroll assembly having circumferential section of an outer wall cooperating with said interior surface of said housing to form an enclosure therebetween, said enclosure receiving the liquid that is separated from the solid material, and said outer wall of said frustoconical basket and scroll assembly including a rear wall section cooperating with said interior surface of said housing to form a cavity therebetween; the centrifuge comprising:

noncontacting seal means connected to the housing and the frustoconical basket and scroll assembly for separating the enclosure and the cavity, thereby restraining a flow of liquid between the enclosure and the cavity; and means connected to said housing for injecting a fluid into said noncontacting seal means between said housing and said frustoconical basket and scroll assembly for cleaning said noncontacting seal means.

23. A centrifuge for processing a combined liquid and solid material to separate the liquid from the solid material comprising:

a housing having an exterior wall including a front wall and an end wall and a peripheral wall disposed therebetween and an interior surface bounding a contained volume within said housing;

a basket member mounted within said housing to rotate about an axis of rotation, said basket member having an outer wall cooperating with said peripheral wall of said housing to form an enclosure therebetween, said enclosure receiving liquid that is separated from the solid material, and said outer wall of said basket member including a rear wall section having an opening therein and cooperating with said end wall of said housing to form a cavity therebetween, said cavity being separated from said enclosure so that fluid is inhibited from flowing into said cavity;

a scroll member mounted within said basket member to rotate about said axis of rotation relative to said basket member, said scroll member having
a tubular side wall,
a rear end wall closing one end of the tubular side wall and extending outward from the tubular side wall, and
a helical screw flight extending outward from said tubular side wall and extending between a rear end and a front end of said scroll member, one end of said helical screw flight connecting with said rear end wall; and means extending into said cavity for injecting a fluid through said opening of said rear wall section of said basket member to clean surfaces located between said rear wall section of said basket member and said rear end wall of said scroll member.

24. A centrifuge for processing a combined liquid and solid material into a separated liquid from the solid material comprising:

a housing having an exterior wall including a front wall and an end wall and a peripheral wall disposed therebetween and an interior surface adjacent said front wall;

a basket member mounted for rotation about an axis of rotation within said housing, said basket member having
a front side,
a screen having a front edge formed to be adjacent said front side of said basket member,
a clamping ring having a rear surface proximate said front side of said basket member for securing said front edge of said screen to said basket member,
a cleaning blade mounted to a front surface of said clamping ring, said cleaning blade rotating with said basket member with respect to said housing for removing solid material from said interior surface of said housing,
a fastener passing through said cleaning blade, clamping ring and connected to said basket member, and
a teflon gasket located between said cleaning blade and said clamping ring, said teflon gasket having a thickness in the range of from 0.005 inches to 0.020 inches; and a scroll member mounted for rotation about the axis of rotation relative to said basket member and further having
a tubular side wall having a closed rear end adjacent said closed end of said basket member, and
a helical screw flight extending outward from said tubular side wall and extending between said rear end and said front end of said scroll member.

25. A centrifuge for processing a combined liquid and solid material to separate the liquid from the solid material comprising:

a housing having a front wall, an end wall and a peripheral wall disposed therebetween;

a basket and scroll assembly mounted for rotation about an axis of rotation within said housing, said basket and scroll assembly having a closed rear wall and a circumferential wall, and said basket and scroll assembly discharging liquid through said circumferential wall and discharging solid material from a front end adjacent said front wall of said housing; and said housing further including an annular discharge channel located concentrically about the axis of rotation between said front wall of said housing and said front end of said basket and scroll assembly, said annular discharge channel encompassing said front end of said basket and scroll assembly and receiving the solid material separated from the liquid, said annular discharge channel intersecting a generally vertical discharge chute to form an approximately rectangular discharge opening at a lowermost point of said discharge channel, said discharge opening having a width approximately equal to a width of the annular discharge channel as measured parallel to the axis of rotation, and said discharge opening having a length substantially less than a diameter of said annular discharge channel.

26. The apparatus of claim 25 wherein said basket and scroll assembly has at least one cleaning blade mounted thereto, said cleaning blade sweeping through said discharge channel to sweep solid material in said discharge channel in response to rotation of said basket and scroll assembly, and said discharge chute having an upper section intersecting said annular discharge channel approximately tangentially whereby said cleaning blade sweeps said solid material directly into said upper section of said discharge chute.

27. The apparatus of claim 26 wherein such that a second side of said discharge chute opposite said first side forms an acute angle with said annular discharge channel.

28. The apparatus of claim 25 wherein said annular discharge channel intersects said discharge chute such that a first side of said discharge chute is approximately tangential to said annular discharge channel.

29. A centrifuge for processing a combined liquid and solid material into a separated liquid from the solid material comprising:
 a housing having an exterior wall including a front wall and a rear wall and a peripheral wall disposed therebetween and an interior surface adjacent the front wall;
 a basket member mounted for rotation about an axis of rotation within the housing, the basket member having a front edge;
 a screen having a forward lip formed over the front edge of the basket member;
 a clamping ring proximate the basket member for securing the forward lip of the screen to the basket member;
 a first gasket located between the clamping ring and one side of the forward lip of the screen; and
 a scroll member mounted for rotation about the axis of rotation relative to the basket member and further having
  a tubular side wall having a closed rear end adjacent the closed end of the basket member, and
  a helical screw flight extending outward from the tubular side wall and extending between the rear end and the front end of the scroll member.

30. The apparatus of claim 24 wherein said basket member further comprises a white neoprene gasket located between said clamping ring and said front edge of said screen.

31. The centrifuge of claim 29 further comprising a second gasket located between an opposite side of the forward lip of the screen and the basket member.

* * * * *